United States Patent [19]

Takekoshi et al.

[11] Patent Number: 5,247,498
[45] Date of Patent: Sep. 21, 1993

[54] OPTICAL DISK DRIVE APPARATUS AND A SEEK METHOD SPIRAL TRACK

[75] Inventors: Makoto Takekoshi, Yokohama, Japan; Lawrence D. Tipton, Tucson, Ariz.

[73] Assignee: International Business Machines Corporation, Armonk, N.Y.

[21] Appl. No.: 714,946

[22] Filed: Jun. 13, 1991

[30] Foreign Application Priority Data

Jun. 29, 1990 [JP] Japan ................... 2-170398

[51] Int. Cl.⁵ .............................................. G11B 7/00
[52] U.S. Cl. .................... 369/32; 369/44.28; 369/44.11; 360/78.07
[58] Field of Search ............ 369/32, 44.11, 44.28, 369/44.29, 44.32, 54, 59, 33, 41, 44.33, 44.34; 360/77.02, 78.05, 78.04–78.14; 358/342, 709

[56] References Cited

U.S. PATENT DOCUMENTS

| | | | |
|---|---|---|---|
| 4,607,358 | 8/1986 | Maeda et al. | 369/44.28 |
| 4,622,604 | 11/1986 | Hashimoto et al. | 360/78.07 |
| 4,926,405 | 5/1990 | Hangai et al. | 369/44.11 |
| 4,931,889 | 6/1990 | Osafune | 360/78.07 |
| 5,016,126 | 5/1991 | Horie et al. | 360/78.07 |
| 5,042,019 | 8/1991 | Kitai et al. | 369/32 |
| 5,063,549 | 11/1991 | Yamamuro | 369/32 |
| 5,088,075 | 2/1992 | Yokota | 369/32 |
| 5,191,566 | 3/1993 | Yamaguchi et al. | 369/32 |

FOREIGN PATENT DOCUMENTS

1130327  5/1989  Japan .

Primary Examiner—Aristotelis Psitos
Assistant Examiner—Thang V. Tran
Attorney, Agent, or Firm—M. W. Schecter; D. A. Shifrin

[57] ABSTRACT

The invention calculates the number of track crossing signals to be counted until a target position is reached without an actual seek operation, thus making it possible to complete a seek operation in a short time and without the need of the additional seek operation disclosed in the related art. A memory means is provided for storing the relation between the number of tracks (Delta t) from a current position to a target position and an indicator of the movement of said optical head toward said target position. A control means is provided for calculating the number of track crossing signals to be counted during a seek operation based on said stored relation when the target position is given, and for generating a control signal causing said optical head to seek based on the number of the calculated track crossing signals.

5 Claims, 4 Drawing Sheets

| TRACK DISTANCE FROM CURRENT POSITION TO TARGET POSITION ($\Delta t$) | THE NUMBER OF SECTORS THROUGH WHICH OPTICAL HEAD PASSES ($\Delta s$) |
|---|---|
| 0 ~ 2 | 1 |
| 3 ~ 5 | 2 |
| 7 ~ 8 | 3 |
| 9 ~ 12 | 4 |
| 13 ~ 17 | 5 |
| 18 ~ 22 | 6 |
| 23 ~ 29 | 7 |
| ⋮ | ⋮ |

OPTICAL DISK DRIVE APPARATUS AND A SEEK METHOD SPIRAL TRACK

BACKGROUND OF THE INVENTION

1. Field of the Invention

This invention relates to an optical disk drive apparatus. More particularly, this invention relates to a method for seeking spiral tracks of an optical disk.

2. Description of the Related Art

Figure 6:
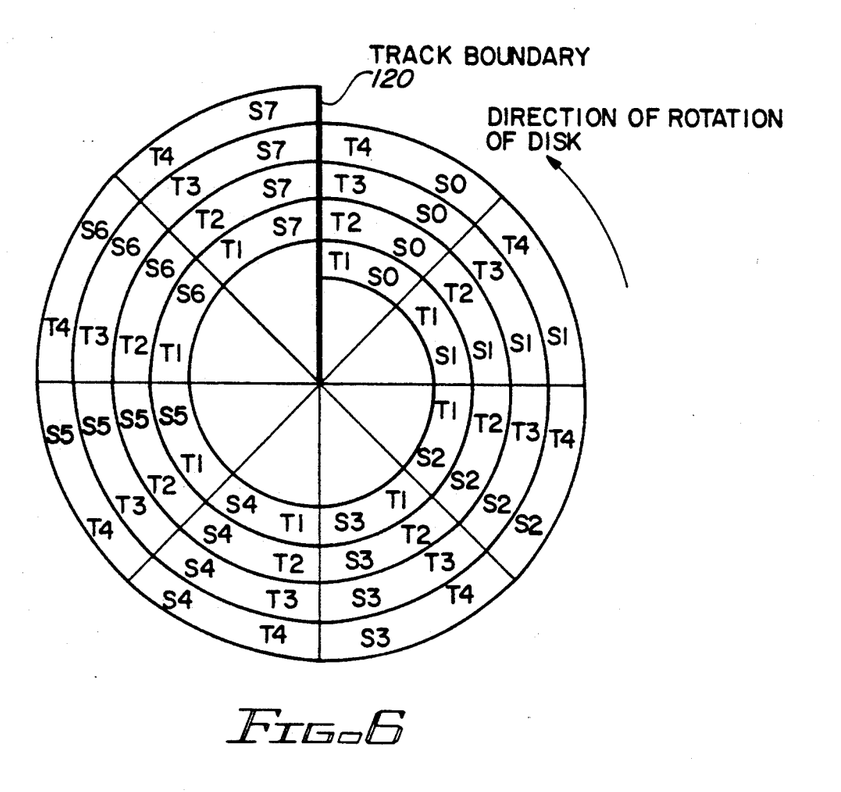
FIG. 6 is a top view of the structure of spiral tracks.

FIG. 6 shows how spiral tracks are formed on an optical disk. In the figure, t1, t2, t3,, etc. are track identification numbers and s1, s2, s3, etc. are sector identification numbers, respectively. Each sector contains a track identification number and a sector identification number. In spiral tracks, track identification numbers change as one crosses the track boundary 120.

If a seek operation is performed from the current position of a track identification tA to the target position of a track identification tB, a number equal to a track distance Delta t(=tB−tA) is held in a track number counter. The track crossing signals generated during a seek operation are counted and the seek operation is continued until the number of track crossing signals counted is equal to the value (Delta t) held in the track number counter. However, it is difficult to properly reach a target position by the mere counting of track crossing signals equal to a track distance (Delta t) when a seek operation for spiral tracks is performed. It is, therefore, difficult to reach the target position in a short time.

It is clear that for spiral tracks, if an optical head does not move at all in the radial direction of the disk (not perform a seek operation), a track crossing signal is generated in response to the optical head crossing the track boundary once each time the disk rotates once. On the other hand, if the disk does not rotate at all, the number of tracks through which the optical head passes during a seek operation (that is, the number of track crossing signals) accords with a track distance (Delta t). Thus, with spiral tracks, the number of times the optical head crosses a track during a seek operation within the range of a track distance (Delta t) does not necessarily accord with the track distance (Delta t) because of the rotation of the disk during seek operation.

To avoid this problem with respect to reaching a target track, Japanese Published Unexamined Patent Application (PUPA) No. 1-130327 discloses a method of reaching the target track wherein a detector is provided to actually detect the rotation number of the disk during a seek operation. A seek operation is continued until the track crossing signals counted are equal to a track distance (Delta t) and then an additional seek operation occurs wherein track crossing signals counted are equal to the number of rotations of the disk detected by said detector.

This method is weak in that two seek operations are needed to finally reach a target position. Thus, it is impossible to reach the target position in a short time.

SUMMARY OF THE INVENTION

The object of this invention is to make it possible to reach a target position on a spiral track in a short time.

The invention calculates the number of track crossing signals to be counted until a target position is reached without an actual seek operation, thus making it possible to complete a seek operation in a short time and without the need of the additional seek operation disclosed in the related art. A memory means is provided for storing the relation between the number of tracks (Delta t) from a current position to a target position and an indicator of the movement of said optical head toward said target position. A control means is provided for calculating the number of track crossing signals to be counted during a seek operation based on said stored relation when the target position is given, and for generating a control signal causing said optical head to seek based on the number of the calculated track crossing signals.

Also, this invention employs a method for seeking spiral tracks from a current position given by a track identification tA and a sector identification sA to a target position given by a track identification tB and a sector identification sB, comprising the steps of: previously storing the relation between a track distance Delta t=tB−tA and the number of sectors Delta S through which the optical head passes during a seek operation performed until the target track is reached, and obtaining an absolute value |N| of the number of track crossing signals to be counted during a seek operation until the target track is reached from the expression:

$$N = \text{Delta } t - \text{integer } [(\text{Delta } S + sA)/S]$$

if a decimal of $$[(\text{Delta } S + sA)/S] \text{ is less than } sB/S$$

and from the expression:

$$N = \text{Delta } t - \text{integer } [(\text{Delta } S + sA)/S] - 1$$

if a decimal of $$[(\text{Delta } S + sA)/S]$$

is greater than or equal to sB/S where S is the number of sectors per track. This makes it possible to complete the seek operation at a position within the previous one track of said target sector, and to make it impossible to pass by a track designated as the target track. The position within the previous one track of said target sector refers to a position at which the target sector is reached before the disk rotates once if a track following operation is started at that position.

The foregoing and other objects, features and advantages of the invention will be apparent from the following more particular description or preferred embodiments of the invention, as illustrated in the accompanying drawings.

DETAILED DESCRIPTION OF THE PREFERRED EMBODIMENTS

Figure 1:
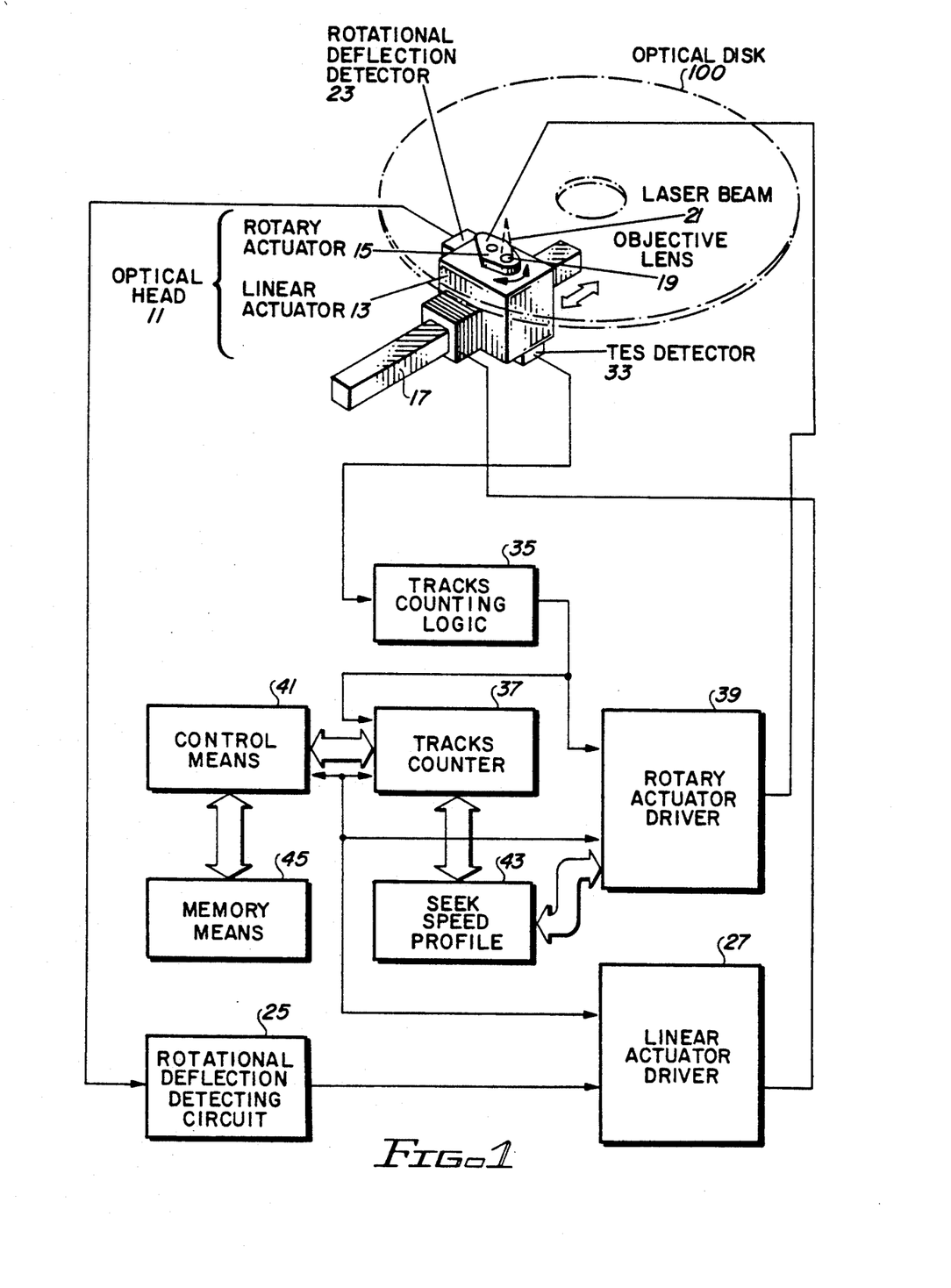
FIG. 1 is a block diagram showing the structure of a preferred embodiment of an optical disk drive apparatus according to the invention.

FIG. 1 shows an embodiment of an optical disk drive apparatus according to this invention. In the figure, an optical head 11 is composed of a linear actuator 13 and a rotary actuator 15. The linear actuator 13 is supported by a rail 17 so that it can move freely in the radial direction of an optical disk 100. The rotary actuator 15 is supported by the linear actuator 13 so that it can rotate freely within the range of a predetermined angle of rotation. The rotary actuator 15 has an objective lens 19 fixed from which a laser beam 21 irradiates the optical disk 100.

The optical disk 100 is formed of spiral tracks. A spot from laser beam 21 on the optical disk 100 can move across the spiral tracks when the rotary actuator 15 rotates on the linear actuator 13. Also, a rotational deflection of the rotary actuator 15 to the linear actuator 13 is detected by a rotational deflection detector 23, an output of which is provided to a rotational deflection detecting circuit 25 for amplification and level adjustment. An output of the rotational deflection detecting circuit 25 is provided to a linear actuator driver 27 so that the linear actuator 13 can drive according to the direction of rotation and the quantity of the rotational deflection of the rotary actuator 15 to the linear actuator 13.

Figure 2:
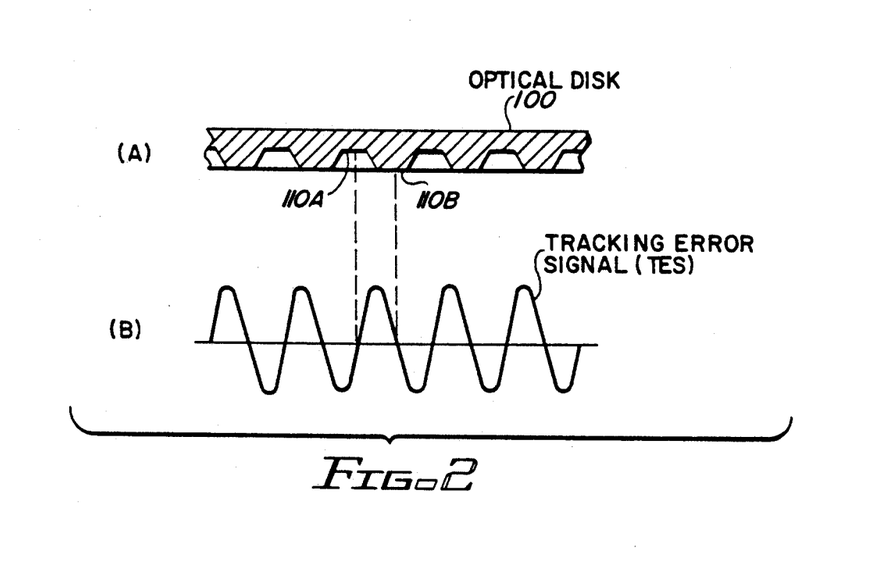
FIG. 2(A) and FIG. 2(B) are a sectional view of the structure of an optical disk and a waveform chart showing a track crossing signal, respectively.

As shown in FIG. 2(A), the spiral tracks of the optical disk 100 include groove 110A. The positional relation of a spot of laser beam 21 to a track, in the direction in which the spot crosses the track, is detected by a TES (tracking error signal) detector 33 mounted as track crossing signal generating means on the linear actuator 13.

As shown in FIG. 2(B), a TES is generated as a spot of laser beam 21 moves in the direction in which the spot crosses groove 110A. This means that the TES is a track crossing signal. The TES is zero when the center of a spot of laser beam 21 accords with the middle of groove 110A and that of a land 110B.

A TES detected by the TES detector 33 is inputted to the tracks counting logic 35 from which a signal indicating that a spot of a laser beam 21 crossed one track is outputted each time it crosses the track. The output signal is provided to the tracks counter 37 and the rotary actuator driver 39.

The tracks counter 37 is given a value corresponding to a target position by the control means 41 at the start of a seek operation. Although the tracks counter 37 holds the given value, it decreases the value by 1 each time a track crossing signal is inputted from the tracks counting logic 35. When the content of the tracks counter 37 becomes zero, tracks counter 37 issues a signal informing the control means 41 that the content of the tracks counter 37 is zero, and in response to the signal, the control means 41 issues a control signal to the linear actuator driver 27 and the rotary actuator driver 39 to complete the seek operation of the optical head 11.

The content of the tracks counter 37 is also given to the seek speed profile 43. The seek speed profile 43 is provided for reference by the rotary actuator driver 39 during a seek operation for the purpose of controlling a seek speed so that its desired value can be obtained, and stores the relation between the number of tracks from a current position to a target position (that is, track distance Delta t) and a target speed. The tracks counter 37 gives the seek speed profile 43 information on a current position varying with time during a seek operation so that a value of a target speed given to the rotary actuator driver 39 can be changed to a proper value as required during the progress of the seek operation.

The control means 41 is connected to a memory means 45 in which the relation between the number of tracks from a current position to a target position (track distance Delta t) and an indicator for the movement of the optical head 11 toward the target position is stored. The control means 41 calculates the number of track crossing signals to be counted during a period of seek operation based on said stored relation at a time when a target position is given and generates a control signal causing the optical head 11 to seek based on the number of the calculated track crossing signals.

Figure 3:
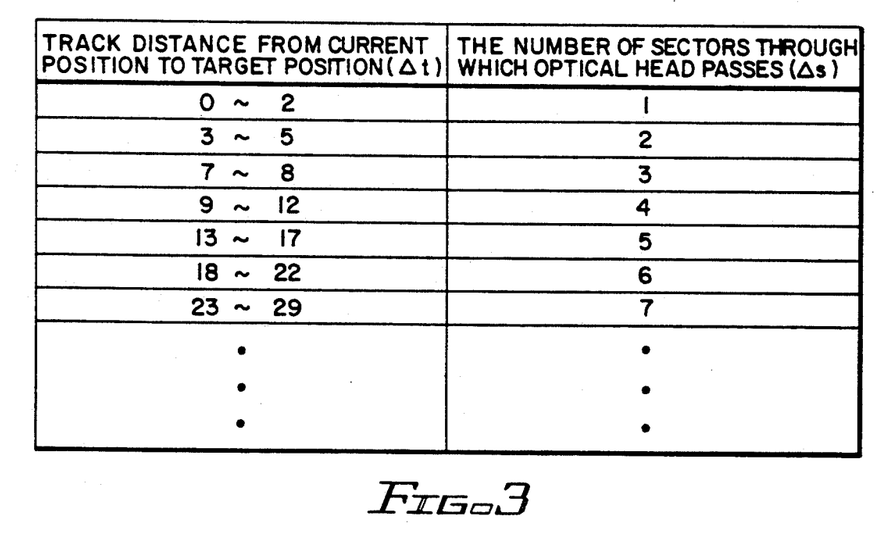
FIG. 3 is a table showing the relation between a track distance (Delta t) and the number of sectors (Delta S) through which an optical head passes during a seek operation, stored in a memory means in said preferred embodiment.

FIG. 3 shows the content of storage in the memory means 45 in which the relation between the number of tracks from a current position to a target position (Delta t) and the number of sectors (Delta S) through which the optical head 11 passes during a seek operation for the tracks is stored. According to the relation illustrated in the figure, for example, if a seek operation is performed within the range of the track distance 9 to 12 (Delta t=9 to 12), the optical head 11 must pass through four sectors (Delta S=4).

The seek speed of the optical head 11 is controlled through reference to the seek speed profile 43 and a predetermined seek speed can be attained according to a track distance Delta t to a target track. Therefore, the relation between a track distance Delta t to a target track and a seek time Delta T in which the target track is reached during a seek operation for those tracks is uniquely determined.

Figure 4:
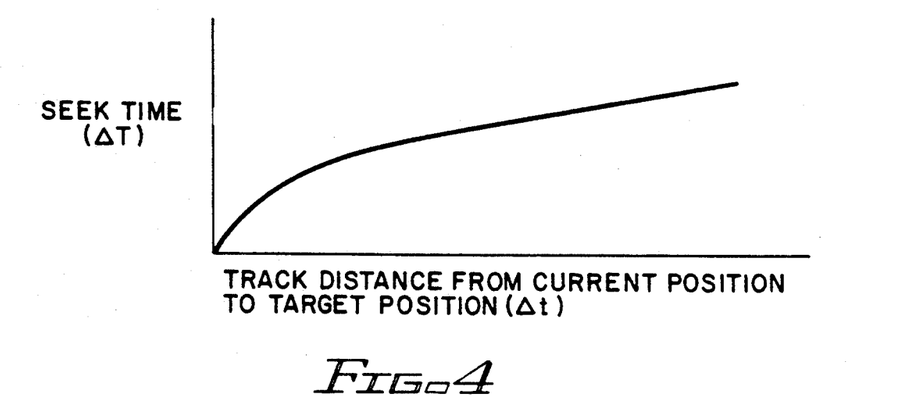
FIG. 4 is a graphical representation showing the relation between a track distance (Delta t) and a seek time (Delta T) in said preferred embodiment.

FIG. 4 shows the relation between a track distance Delta t and a seek time Delta T thus obtained. A seek time Delta T can be converted to Delta S representing the number of sectors through which the optical head passes during a period of seek operation. First, a time required for one revolution of the optical disk 100 is fixed since the rotational speed of the optical disk 100 is held constant under control.

Let the time required for one revolution be Tr, and Delta T/Tr represents the number of rotations of the optical disk 100 in the seek time Delta T. Let the number of sectors per track be S, and (Delta T/Tr)×S is equal to Delta S, representing the number of sectors through which the optical head 11 passes in the seek time Delta T since the number of sectors per track is fixed (refer to FIG. 6). The above relation can be expressed as follows:

Delta S=(Delta T/Tr)×S where Tr and S denote the time required for one revolution and the number of sectors per track respectively. Since Tr and S are constants, a seek time Delta T can be converted to the number of sectors (Delta S) through which the optical head passes during a seek operation by the above expression.

Figure 5:
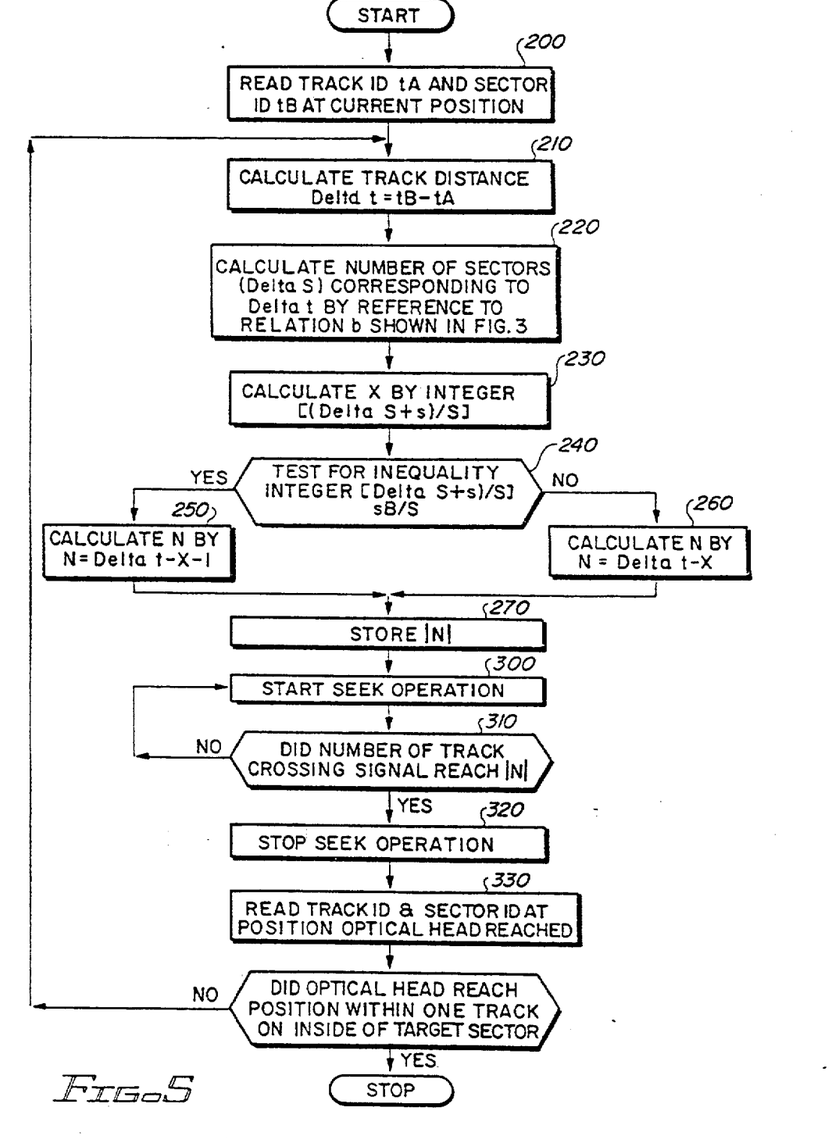
FIG. 5 is a flowchart showing a seek operation in said preferred embodiment.

The following description deals with a preferred embodiment of the seek operation referring to the flowchart shown in FIG. 5. It is assumed that a spiral track is placed in increased radial position from the center point as it is turned clockwise, track identification numbers are arranged in ascending order from inner tracks to outer tracks, sector identification numbers a e arranged in ascending order clockwise, and the disk rotates counterclockwise (Refer to FIG. 6). Accordingly, in track following, the optical head 11 moves from a sector position with a smaller sector identification number to a sector position with a larger sector identification number and moves from a track position with a smaller track identification number to a track position with a larger track identification number each time it crosses the track boundary 120. Also, it is assumed that the track distance Delta t is a positive number if the seek operation is performed towards the outer direction on the disk and the track distance Delta t is a negative number if it is performed towards the inner direction.

At the start of seek operation, a track identification tA and sector identification sA at a current position of the optical head 11 are read first (Processing block 200). Then, given a track identification tB and a sector identification sB at a target position, a seek distance (track distance Delta t) can be obtained by the following expression (Processing block 210):

$$\text{Delta } t = tB - tA$$

The value of Delta S (the number of sectors through which the optical head passed during a period of seek operation) corresponding to Delta t can be obtained from the relation between Delta t and Delta S shown in FIG. 3 (Processing block 220). The number of times the optical head 11 crosses the track boundary 120 during a period of seek operation is obtained from the following equation (Processing block 230):

$$X = \text{Integer}[(\text{Delta } S + sA)/S]$$

where (Delta S+sA) is the sum of the current sector position sA and Delta S which represents the number of sectors through which the optical head 11 passes during a seek operation, and therefore indicates the last sector position which the optical head 11 reaches after the seek operation. S is the number of sectors per track; the optical head 11 crosses the track boundary 120 each time it passes through S sectors. Therefore, the value of X of the integer part of (Delta S+sA/)S indicates the number of times when the optical head 11 crosses the track boundary 120 during a seek operation.

Since the number of times the optical head 11 actually crosses tracks during the seek operation at the track distance Delta t is influenced by the number of times X the optical head 11 crosses the track boundary 120, it must be corrected to remove its effect (Processing blocks 250 and 260).

In this embodiment, the optical head is positioned within one track on the inside of a target sector sB so that the optical head can reach the target sector sB while the disk 100 rotates once without moving the optical head in the backward direction by performing only a track following operation after the completion of the seek operation. If the seek operation is completed at such a position, the optical head can reach the target sector position while the disk rotates once only by turning to the track following operation.

For this purpose, the value of the decimal of [(Delta S+sA)/S] and sB/S are compared with each other (Decision block 240). The value of the decimal of [(Delta S+sA)/S] indicates an angle that the position which the optical head 11 reaches when it moves by the number of sectors Delta S from the current sector sA, makes on the circumference of the track. On the other hand, sB/S indicates an angle that the position of the target sector sB makes on the circumference of the track. Therefore, if the decimal of [(Delta S+sA)/S] >= sB/S is established, the seek operation such that track crossing signals are counted by the difference of X from Delta t causes the optical head 11 to reach the target track tB but passes through the target sector sB. To avoid this, the number |N| of track crossing signals to be counted during the seek operation is used. If the decimal of [(Delta S+sA/S] >= sB/S is established, |N| is obtained from the following equation (Processing block 250):

$$N = \text{Delta } t - X - 1$$

If the decimal of [(Delta S+sA)/S] < sB/S is established,. |N| is obtained from the following equation (Processing block 260):

$$N = \text{Delta } t - X$$

The number |N| of track crossing signals to be counted during a seek operation is stored in the tracks counter 37 (Processing block 270). Information on the direction of the seek operation can be obtained from the sign of N.

Now the seek operation is started (Processing block 300). The tracks counter 37 is decreased during the seek operation each time the optical head 11 crosses a track and issues a signal when its content is zero. In accordance with the signal (Decision block 310), the control means 41 makes the seek operation complete (Processing block 320).

Next, track and sector identification at the reached position are read (Processing block 330), a check is made to see if the optical head 11 is positioned within one track on the inside of the target position (Decision block 340), and the seek operation is completed if it is positioned within the previous one track at the target position. If the optical head 11 is not within one track on the inside of the target position, an attempt to calculate a track distance Delta t is made again (Processing block 210). Such a retry is where, for example, track crossing signals were counted by mistake due to external noises, etc. In a usual case where such a situation does not occur, the optical head 11 can be within one track on the inside of the target position by only one seek operation.

In the above preferred embodiment, the relation between a track distance Delta t and the number of sectors Delta S was stored in the memory means. However, it will be appreciated that the relation between a track distance Delta t from a current position to a target position and an indicator for the movement of the Optical head towards said target position can be stored instead of the above relation. It will also be appreciated, for example, that the relation between a track distance Delta t and seek time Delta T can be stored. It will also be appreciated that reference to the speed profile indicating the relation between a track distance Delta t and a seek speed at the time can be made to calculate the number |N| of tracks to be counted during the seek operation. It will also be appreciated that a track distance Delta t is not directly stored, but a certain value related to the track distance Delta t can be stored. However, if the relation between a track distance Delta t and the number of sectors Delta S is stored as in the preferred embodiment, a value to be referred to is directly stored so that the number |N| of tracks can be calculated at a high speed and a very exact seek operation can be performed until a target position is reached based on the known quantity of sector movement.

The constitution of spiral tracks and the direction of the rotation of disk also are not limited to the case of the above preferred embodiment.

In the above preferred embodiment, the optical head reached a position within the previous one track of a target sector. However, it will be appreciated that it can reach a position within a predetermined number of tracks rather than one track. It will be appreciated also that it can not only reach the target track, but pass through the target sector. In the above preferred embodiment, the position within the previous one track of the target sector refers to a position within one track on the inside of the target sector. However, it will be appreciated that the position can be a position within one track on the outside of the target sector according to the constitution of spiral tracks and the direction of the rotation of disk, that is, a position from which the optical head can reach the target sector during the track following operation while the disk rotates once.

While the invention has been particularly shown and described with reference to preferred embodiments thereof, it will be understood by those skilled in the art that various changes in form and details may be made therein without departing from the spirit and scope of the invention:

What is claimed is:

1. An optical disk drive for driving an optical disk with spiral tracks, comprising:
   an optical head,
   a signal generator for generating a track crossing signal in response to said optical head crossing a track,
   memory means storing therein a table providing, for each track distance from a current position to a target position, a selected one of
   a seek time required for a seek operation from the current position to the target position, or
   a number of sectors through which the optical head passes during the seek operation,
   control means for calculating, from the selected seek time or number of sectors through which said optical head passes, a number of track crossing signals to be counted during the seek operation, and for generating a first control signal causing said optical head to seek based on the number of the calculated track crossing signals, and
   a counter for receiving and counting the track crossing signals during the seek operation and for transmitting a signal to said control means when the calculated track crossings have been counted, whereby said control means generates a second control signal causing said optical head to terminate the seek operation at the target position.

2. An optical disk drive for driving an optical disk with spiral tracks, comprising:
   an optical head,
   a track crossing signal generating means for generating a track crossing signal in response to said optical head crossing a track,
   memory means storing therein a table providing, for each number of tracks from a current position to a target position, a number of sectors through which said optical head passes during a seek operation from the current position to the target position,
   control means for calculating, from the number of sectors through which said optical head passes, a number of track crossing signals to be counted during the seek operation, and for generating a first control signal causing said optical head to seek based on the number of the calculated track crossing signals, and
   a counter for receiving and counting the track crossing signals during the seek operation and for transmitting a signal to said control means when the calculated track crossings have been counted, whereby said control means generates a second control signal causing said optical head to terminate the seek operation at the target position.

3. An optical disk drive for causing an optical head to perform a seek operation from a current position given by a track identification tA and a sector identification sA to a target position given by a track identification tB and a sector identification sB in a spiral track of an optical disk, comprising:
   track crossing signal generating means for generating a track crossing signal in response to said optical head crossing a track,
   memory means for storing therein a table providing, for each distance Delta t = tB − tA from a current track to a target track, the number of sectors Delta S through which said optical head passes during the seek operation,
   control means for generating a first control signal causing said optical head to seek based on an absolute value |N| of a calculated number of track crossing signals obtained from the expression: N = Delta t − integer{(Delta S + sA)/S} if a decimal of {(Delta S + sA)/S} is less than sB/S and from the expression: N + Delta t − integer {(Delta S + sA)/s} − 1 if a decimal of {(Delta S + sA)/S} is greater than or equal to sB/S, where N denotes the calculated number of track crossing signals to be counted during a seek operation performed until said optical head reaches the target track and S is the number of sectors per track, and
   a counter for receiving and counting the track crossing signals during the seek operation and for transmitting a signal to said control means when the calculated track crossings have been counted, whereby said control means generates a second control signal causing said optical head to terminate the seek operation at the target position.

4. A spiral track seek method for causing an optical head in an optical disk drive to perform a seek operation from a current position to a target position, the method comprising:
   storing a table providing, for each track distance from the current position to the target position, a selected one of:
   a seek time required for the seek operation, or
   a number of sectors through which the optical head passes during the seek operation,
   calculating, from the selected seek time or number of sectors through which said optical head passes, a number of track crossing signals to be counted during the seek operation,
   generating a first control signal causing said optical head to seek based on the number of the calculated track crossing signals, counting the track crossing signals while performing the seek operation, and generating a second control signal causing said optical head to terminate the seek operation at the target position when the calculated track crossings have been counted.

5. A spiral track seek method for causing an optical head in an optical disk drive to perform a seek operation from a current position given by a track identification tA and a sector identification sA to a target position given by a track identification tB and a sector identification sB in spiral tracks of an optical disk, comprising the steps of:

previously storing a table providing, for each track distance Delta t = tB − tA from a current track to a target track, the number of sectors Delta S through which the optical head passes during the seek operation, calculating an absolute value |N| of a number of track crossing signals to be counted during the seek operation from the expression: N = Delta t − integer {(Delta S + sA)/S} if a decimal of {(Delta S + sA)/S} is less than sB/S and from the expression: N + Delta t − integer {(Delta S + sA)/S} − 1 if a decimal of {(Delta S + sA)/s} is greater than or equal to sB/S, where S is the number of sectors per track and integer {(Delta S + sA)/S} is the number track boundaries across which the optical head passes during the seek operation, generating a first control signal causing the optical head to seek based on the number of the calculated track crossing signals, counting the track crossing signals while performing the seek operation, and generating a second control signal causing the optical head to terminate the seek operation at the target position when the calculated track crossings have been counted.

* * * * *

UNITED STATES PATENT AND TRADEMARK OFFICE
CERTIFICATE OF CORRECTION

PATENT NO. : 5,247,498          Page 1 of 3

DATED : September 21, 1993

INVENTOR(S) : M. Takekoshi, et al.

It is certified that error appears in the above-identified patent and that said Letters Patent is hereby corrected as shown below:

The drawing sheet, consisting of Fig. 5, should be deleted to be replaced with the drawing sheet, consisting of Fig. 5, as shown on the attached page.

At column 3, line 8, the word "embodiments" should be --embodiment--.

At column 5, line 3, the word "a e" should be --are--; at line 45, (Delta S + sA/)S should be (Delta S + sA)/S.

At column 8, line 37, N + Delta should be N = Delta; at line 38, S + sA)/s}-1 should be S + sA)/S}-1.

At column 10, line 4, N + Delta should be N = Delta; at line 5, (Delta S + sA)/s should be (Delta S + sA)/S .

Signed and Sealed this

Sixteenth Day of August, 1994

BRUCE LEHMAN

Attest:

Attesting Officer      Commissioner of Patents and Trademarks

UNITED STATES PATENT AND TRADEMARK OFFICE
CERTIFICATE OF CORRECTION

PATENT NO. : 5,247,498

DATED : September 21, 1993

INVENTOR(S) : M. Takekoshi, et al.

It is certified that error appears in the above-identified patent and that said Letters Patent is hereby corrected as shown below:

At column 6, line 12, [(Delta S+sA/S]>=sB/S should be [(Delta S+sA)/S]>=sB/S.

At column 8, line 35, N=Delta t-integer (Delta S+sA/S} should be N=Delta t-integer (Delta S+sA)/S}.

Fig. 5